Sept. 6, 1927.  1,641,911

T. TSCHUDI

ROTARY ENGINE

Filed July 10, 1925　　　5 Sheets-Sheet 1

WITNESSES
H. T. Walker
Hugh H. Ott

INVENTOR
Traugott Tschudi
BY
ATTORNEYS

Sept. 6, 1927.   T. TSCHUDI   1,641,911
ROTARY ENGINE
Filed July 10, 1925   5 Sheets-Sheet 2
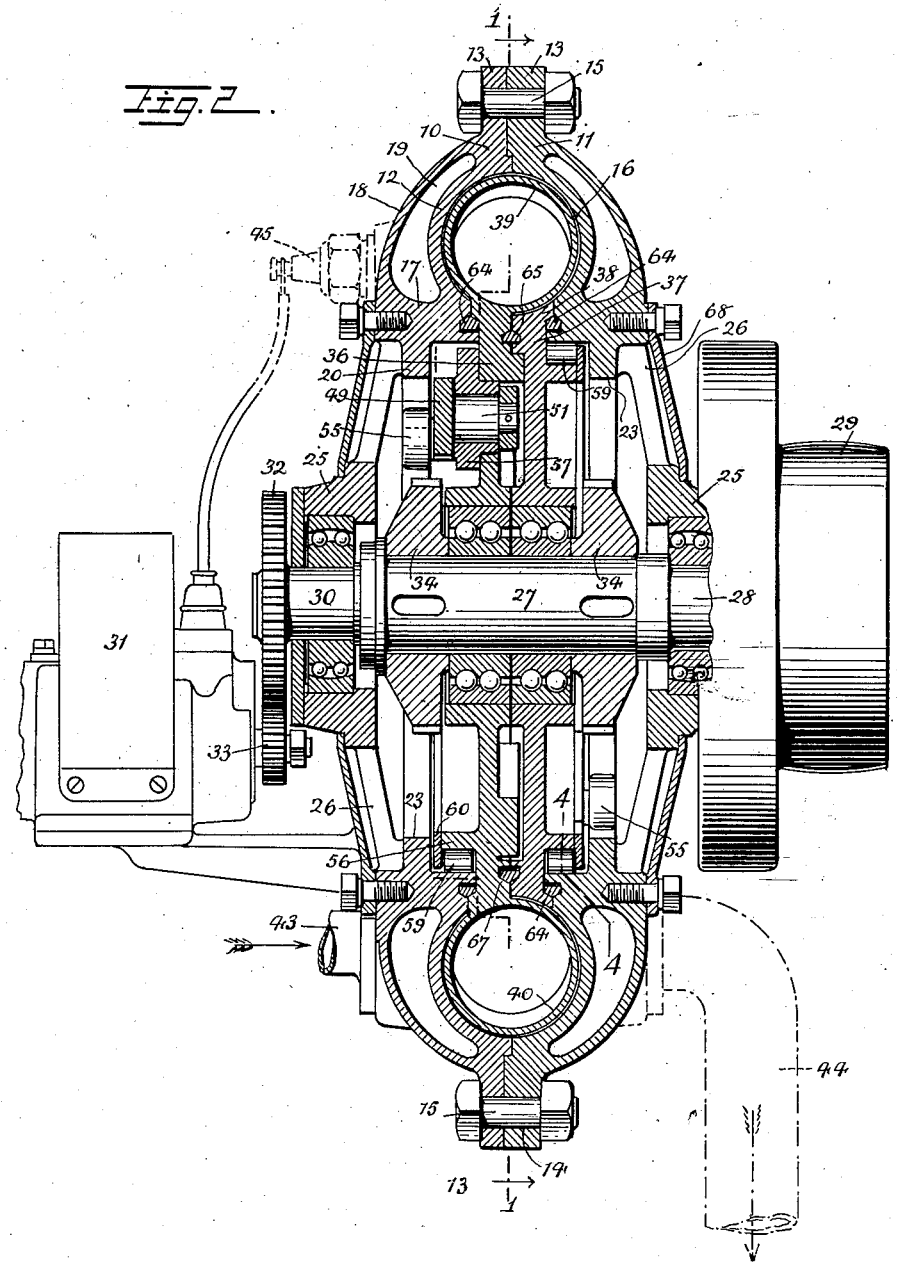

Sept. 6, 1927.   T. TSCHUDI   1,641,911
ROTARY ENGINE
Filed July 10, 1925   5 Sheets-Sheet 3
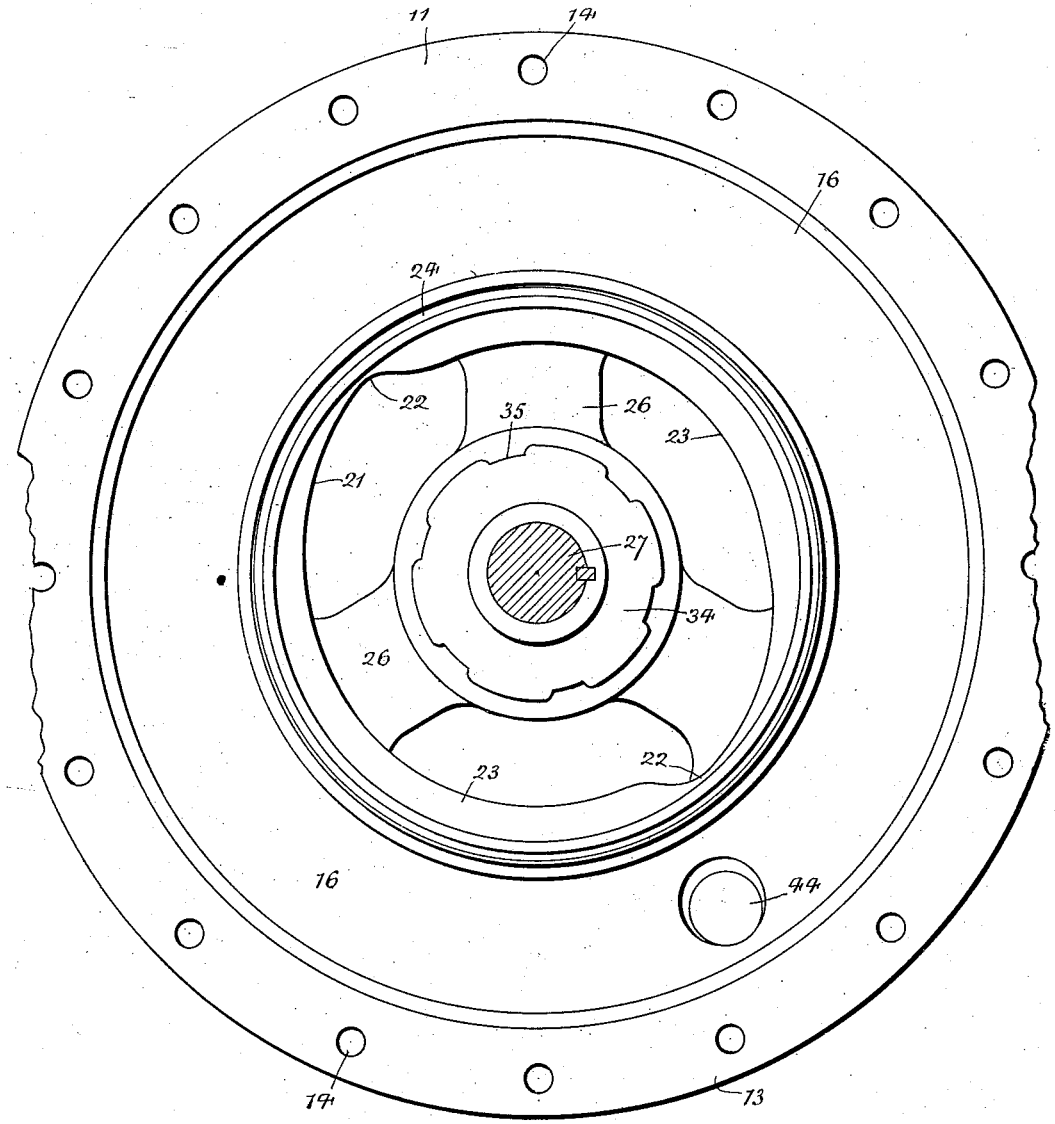
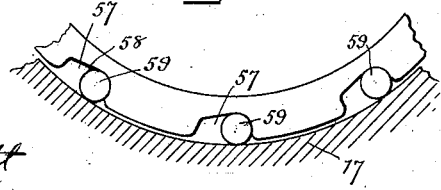

Sept. 6, 1927.  T. TSCHUDI  1,641,911
ROTARY ENGINE
Filed July 10, 1925   5 Sheets-Sheet 4
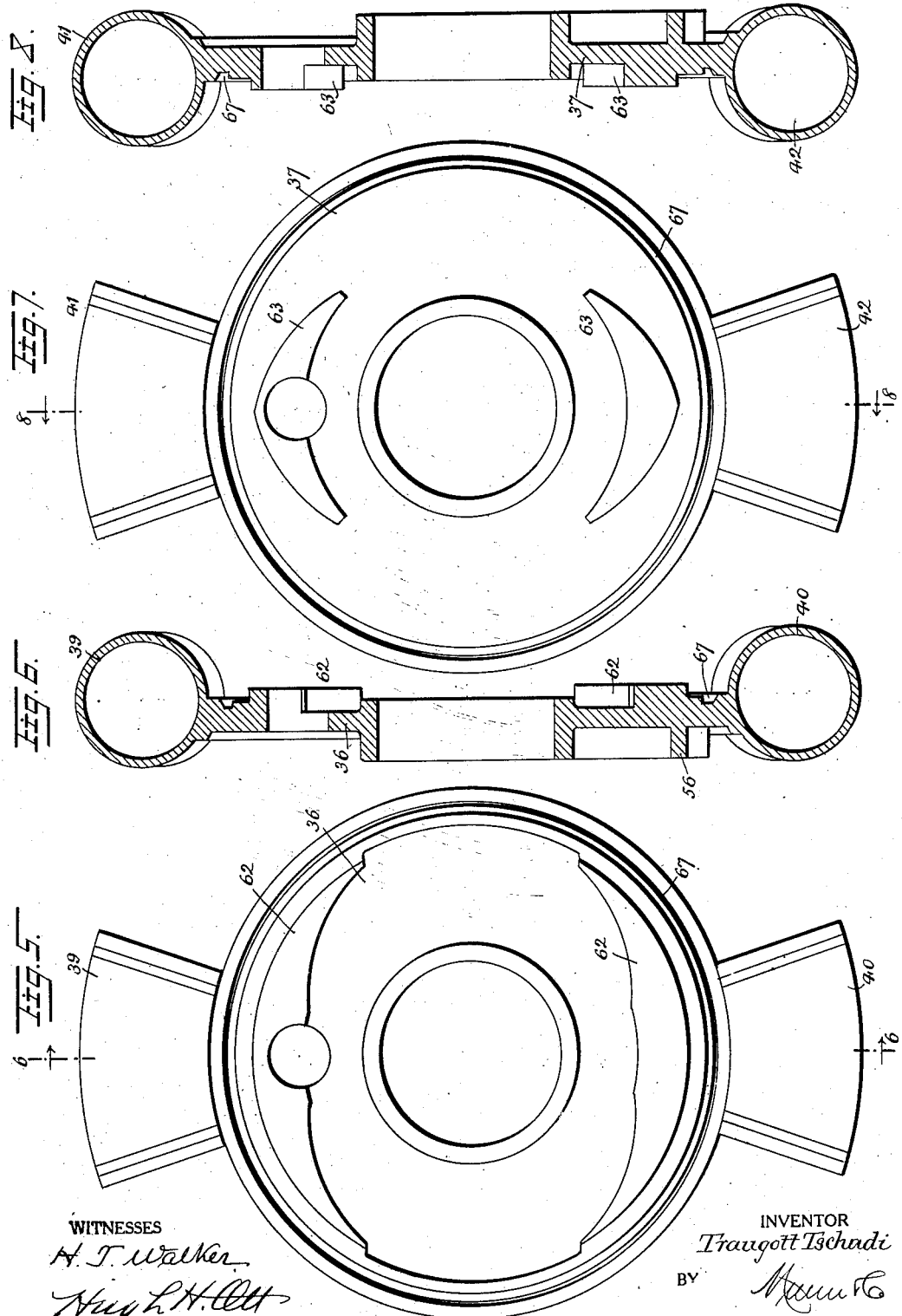
WITNESSES
INVENTOR
Traugott Tschudi
BY
ATTORNEYS Sept. 6, 1927.  T. TSCHUDI  1,641,911
ROTARY ENGINE
Filed July 10, 1925  5 Sheets-Sheet 5

WITNESSES

INVENTOR
Traugott Tschudi
BY
ATTORNEYS

Patented Sept. 6, 1927.

1,641,911

UNITED STATES PATENT OFFICE.

TRAUGOTT TSCHUDI, OF NEW YORK, N. Y.

ROTARY ENGINE.

Application filed July 10, 1925. Serial No. 42,769.

This invention relates to prime movers and has particular reference to an improvement in rotary engines which are especially designed to be driven by internal combustion although not necessarily limited thereto.

The invention comprehends a rotary engine or motor, by means of which power impulses are imparted to a drive shaft through the medium of a pair of rotors which are successively coupled with the drive shaft, and each of which rotors is provided with diametrically disposed pistons movable in an annular chamber or toroidal cylinder, constituting a part of the stator, to sub-divide the chamber or cylinder into a plurality of separate compartments successively registering with ports in the chamber or cylinder for respectively receiving a charge producing a force for moving the same and for discharging the charge when the force is spent, and in which adjacent pistons constitute, respectively, fixed and movable abutments, whereby the rotor carrying the movable piston coupled with the shaft imparts turning motion thereto.

One of the outstanding objects of the present invention is to provide a rotary motor or engine in which valves and valve-operating means are dispensed with, thereby eliminating faulty operation due to improper timing and seating of the valves.

As a further objective, the invention comprehends a motor in which vibration is reduced to an absolute minimum, and in which crank shafts and connecting rods are dispensed with.

As a still further object, the invention provides an improved rotary motor which is comparatively simple in its construction and mode of operation, which is comparatively inexpensive to manufacture and assemble, and which is highly efficient in its purpose.

With the above recited and other objects in view, reference is had to the following specification and drawings in which there is exhibited one example or embodiment of the invention which is in no way intended as a limitation upon the scope of the appended claims as it is to be clearly understood that variations and modifications which properly fall within the scope of said claims may be resorted to when found expedient.

In the drawings—

Fig. 2 is a transverse sectional view taken approximately on the line indicated at 2—2 in Fig. 1;

Fig. 3 is an inner face view of one of the casing sections;

Fig. 4 is a fragmentary sectional view taken approximately on the line 4—4 of Fig. 2, to illustrate the means for limiting the rotors to rotation in one direction and for locking the same against retrograde movement;

Fig. 5 is an inner face view of one of the rotors;

Fig. 6 is a sectional view therethrough taken approximately on the line 6—6 of Fig. 5;

Fig. 7 is an inner face view of the other rotor;

Fig. 8 is a sectional view therethrough taken approximately on the line 8—8 of Fig. 7;

Figure 1:
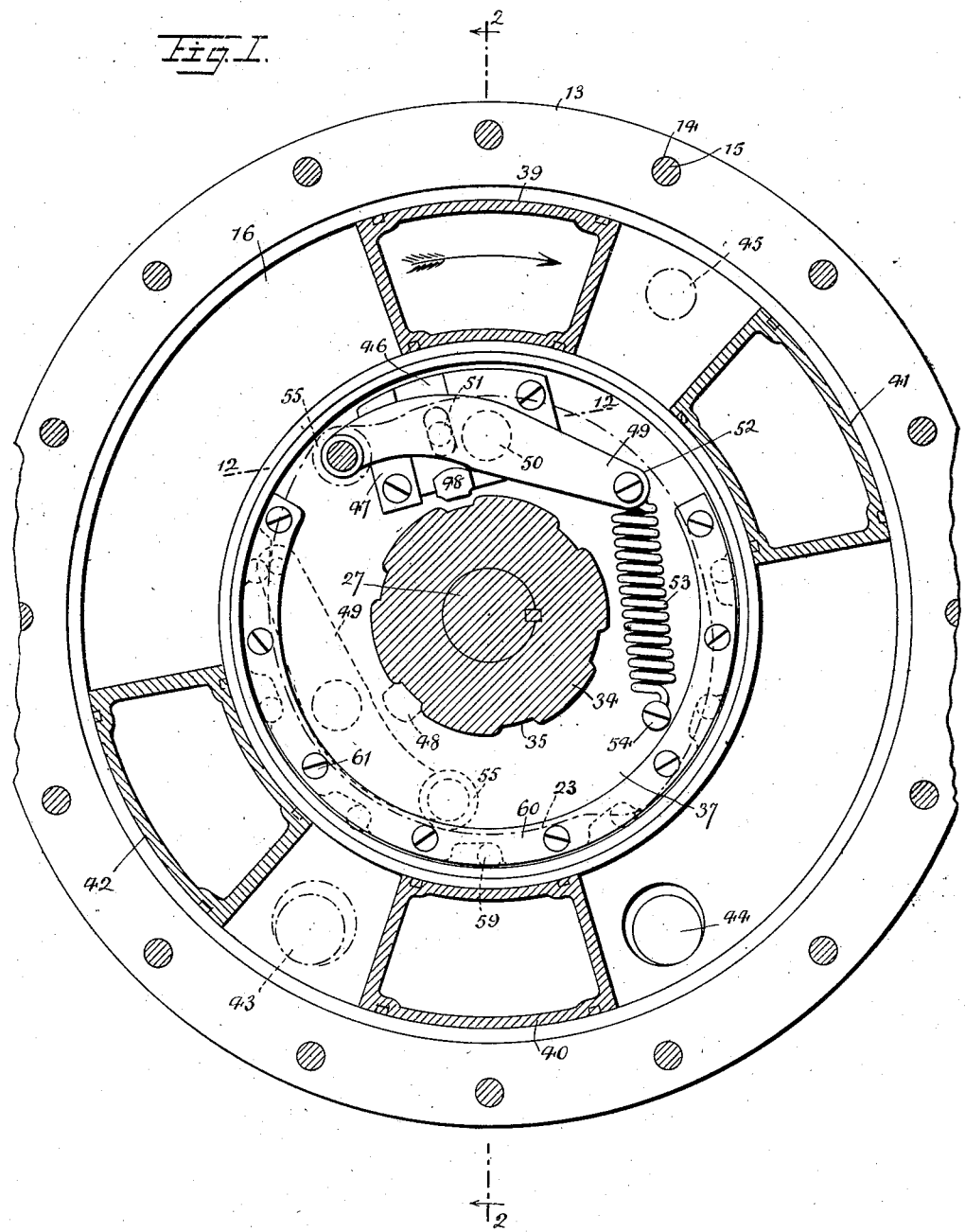
Figure 1 is a vertical sectional view through a motor constructed in accordance with the invention, said section being taken approximately on the line 1—1 of Fig. 2.

Referring to the drawings by characters of reference, the engine includes a casing comprising mating sections 10 and 11, of substantially identical construction, each including an annular wall 12 of substantially semi-cylindrical configuration in cross section, formed with an outwardly projecting annular flange 13 having alined or registering openings 14 to receive therethrough bolts 15 for clamping the casing sections together in mated relation, so that the annular semi-circular cross-sectional walls 12 define together a toroidal cylinder or annular chamber 16. The inner ends of the walls 12, however, are spaced apart to define an annular groove therebetween, the purpose of which will be hereafter set forth. The inner ends of the walls 12 have formed integral therewith an outwardly projecting annular flange 17, between which flanges 17 and the flanges 13 a jacket 18 extends to provide a circular space 19 for receiving water or other cooling medium. Extending radially inward from each flange 17, is a circumferential bead 20, which is formed to provide an inner cam face 21 having diametrically disposed radial depressions 22 connected by an arcuate eccentric portion 23. The inner vertical face of each flange 17 is formed with an annular groove 24 to receive a packing ring which will be hereafter described.

Each casing section is further provided with a concentric bearing hub 25 disposed in axial alinement with the hub of the other section when the sections are mated, and supported from the flanges 17 by the radial spokes or arms 26. A drive shaft 27 is journaled, respectively, in the bearing hubs 25, and has keyed to one projecting end 28, a drive pulley 29, or any other suitable element for transmitting the power derived from the motor. The opposite projecting end 30 of the shaft is operatively connected with a spark-timing device 31, through the medium of the timing gears 32 and 33. The drive shaft has keyed thereto for turning movement therewith between its bearing points, axially spaced coupling elements 34 having circumferentially spaced peripheral notches 35. A pair of disk-like members 36 and 37, constituting, respectively, a pair of rotors, are loosely mounted on the drive shaft for independent turning movement between the coupling elements 34, with the outer peripheral portions 38 extending through the annular groove defined between the inner extremities of the walls 12. At diametrically opposite points on the periphery of the rotor 36, are arcuate pistons 39 and 40, and at diametrically opposite points on the periphery of the rotor 37, are arcuate pistons 41 and 42, which fit and are movable within the toroidal cylinder or annular chamber 16 so that the cylinder is subdivided into circumferentially spaced chambers adapted, when the motor is used as an internal combustion engine, to respectively serve as a fuel-receiving, compression, explosion and exhaust compartment. To this end, the cylinder or chamber 16 is provided at circumferentially spaced points with intake and exhaust ports 43 and 44, between which an ignition plug 45 controlled by the timing device 31, is interposed.

Each of the rotors 36 and 37 is provided with a radial sliding latch 46 mounted in a guide 47, the latch having a tooth 48 for engagement with the circumferentially spaced notches 35 in the coupling elements 34, when the latch is moved inwardly. The means for moving each latch inwardly consists of a lever 49, fulcrumed at 50 to a portion of the guide 47 and having a pin-and-slot connection 51 with the latch. One extremity 52 of the lever is connected by a coiled contractile spring 53 with the rotor, as at 54, for normally swinging the lever to a position to disengage the tooth 48 from the notches 35. The opposite extremity has mounted thereon a cam roller 55, which engages with the inner cam face 21 of the circumferential bead 20.

Each rotor is provided with a substantially semi-annular lateral outwardly projecting flange 56 formed with circumferentially spaced notches 57 having inclined inner walls 58 and receiving within the notches, rollers 59 which engage, respectively, the inclined inner walls 58 and the inner periphery of the flange 17 of the casing lying within the bead 20, whereby the rotors are limited to a rotating or swinging movement in one direction and whereby the same are locked or prevented from movement in the opposite direction, due to the fact that a jamming action is set up by the rollers between the inner walls 58 of the notches and the inner periphery of the flange 17. Preferably the rollers are confined against lateral outward movement by means of the semi-annular side plates 60, which are secured by anchoring screws 61 to the outer side of the flanges 56. The rotor 36 is provided on its inner face with diametrically positioned inwardly projecting substantially arcuate abutments 62, while the rotor 37 is provided on its inner face with inwardly projecting substantially arcuate complementary abutments 63.

Figure 9:
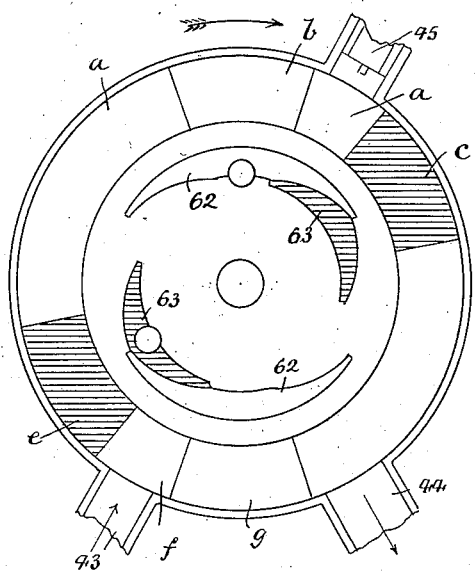
Figs. 9, 10 and 11 are diagrammatic views illustrating the various working positions of the pistons and rotors.
Figure 10:
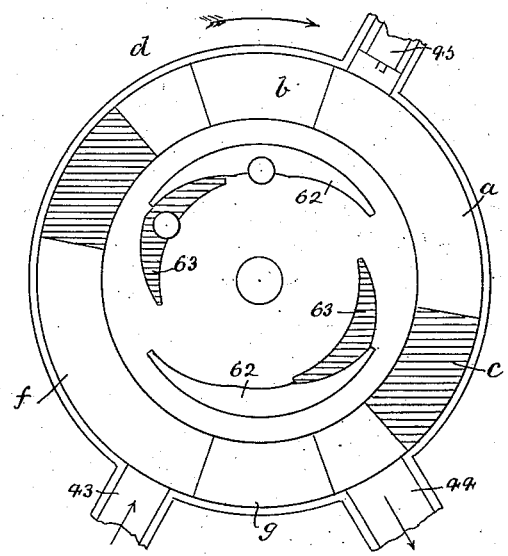

In use and operation of the engine and particularly referring to Fig. 9, compressed fuel within the chamber $a$ defined between pistons $b$ and $c$, is ignited by the ignition device or spark plug 45, so that the piston $c$ attached to rotor 37, will be driven by the force of the explosion, in a clockwise direction, as indicated by the arrow in Fig. 9, from the position illustrated in said figure to the position illustrated in Fig. 10, the piston $b$ of rotor 36 constituting a stationary abutment which is held against retrograde movement by virtue of the rollers 59 in the notches 57. The initial movement of the piston $c$ will effect the riding of the cam roller 55 on to the face portion 23 which may be termed the "high point" of the cam so that the rotor 37, which is now moving, is coupled with the drive shaft through the interengagement of the tooth 48 of the latch, within one of the notches 35 of the coupling element 34, thus moving or turning the shaft with the rotor 37. When the piston $c$ and rotor 37 are in the position illustrated in Fig. 10 the arcuate abutment elements 62 and 63 will become fully engaged whereby the rotor 36 will be moved with the rotor 37 from the position illustrated in Fig. 10 to the position illustrated in Fig. 11. During the time that the piston $c$ and rotor 37 are moving from the position illustrated in Fig. 9 to the position illustrated in Fig. 10, the engagement of the cam roller of the lever on the rotor 36 with the lower portion of the cam face allows the spring 53 to cause the disengagement of the clutch tooth 48 of the clutch element 34, so that the rotor 36, which is at rest, is uncoupled from the shaft. Immediately following the engagement of the abutment elements 62 and 63, as in Fig. 10, the cam roller 55 of the rotor 36 reaches a point on the cam face to cause a connection between the rotor 36 and the shaft so that during a portion of each impulse, both rotors will be coupled to the shaft. When the piston c reaches the position illustrated in Fig. 11, the chamber a will register with the exhaust port 43 to allow the escape of the burnt fuel therefrom, which burnt fuel is forced out by the next explosion in the chamber or compartment d, which is defined between the pistons b and e. It will be further noted that during the movement of the piston c from the position illustrated in Fig. 9 to the position illustrated in Fig. 10, the charge of fuel which has been previously intaken and which is now confined between the piston e and the piston b, will be compressed by the movement of the piston e toward the piston b. It will be still further noted that the chamber f, which is defined between the piston e and the piston g, which chamber is in registry with the intake port 43, will, during the movement of the piston c from the position in Fig. 9 to the position in Fig. 10, receive a charge of fuel, due to the relative movement of the piston e with respect to the piston g, to be subsequently compressed by the next firing stroke.

Figure 11:
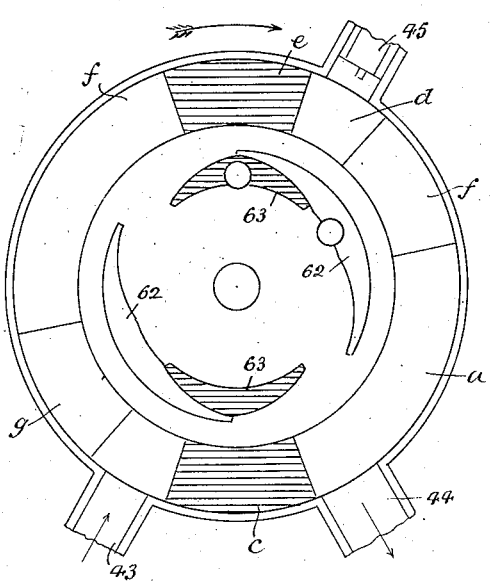
Figure 12:
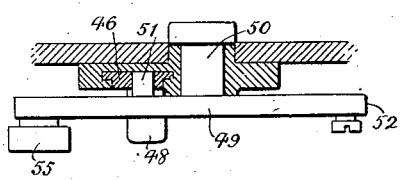
Fig. 12 is a detail fragmentary sectional view taken approximately on the line 12—12 of Fig. 1, illustrating the means for coupling the rotors to the shaft.

The movement of the pistons and rotors to the position illustrated in Fig. 11, places the pistons b and e in a position to dispose the chamber d filled with the compressed fuel, in registry with the ignition device or spark plug 45 to repeat the operation, and it will be observed that three power impulses are given to the shaft during each rotation thereof.

In order to prevent leakage of the fuel from the annular chamber or cylinder 16, between the rotors 36 and 37, and between said rotors and the flanges 17, packing rings 64 and 65 are provided, the former being mounted in the groove 24 and bearing against the annular shoulders 66 on the outer sides of the rotor, and the latter in the complementary packing at the ring grooves 67 in the confronting inner faces of the rotors. In order to further cover and completely house the mechanism, cover plates 68 are secured on outer side of each housing section.

What is claimed is:

1. In a rotary motor, a stator having a toroidal cylinder, a drive shaft extending axially through the stator, a pair of rotors each having a pair of diametrically disposed arcuate pistons arranged within the cylinder for subdividing the same into a plurality of compartments or chambers adapted upon relative movement of the pistons to vary in size, said cylinder having circumferentially spaced fuel intake and exhaust ports, an ignition device communicating therewith between the points of intake and exhaust, coppling elements keyed to the drive shaft having circumferentially spaced peripheral notches, a radially slidable latch on each rotor adapted upon inward radial movement to engage with one of the notches of the coupling elements to couple its rotor with the shaft, a lever pivoted on each rotor having operative connection with the latch for moving the same radially upon swinging movement of the lever, means for normally swinging the lever to move the latch radially outward to a non-coupling relation, a roller on the lever and a cam element formed on the stator having cam faces with which the roller engages for controlling the movement of the latch actuating levers whereby intermittent coupling of the rotors and drive shaft is effected.

2. In a rotary motor, a stator having a toroidal cylinder, a drive shaft extending axially through the stator, a pair of rotors each having a pair of diametrically disposed arcuate pistons arranged within the cylinder for subdividing the same into a plurality of compartments or chambers adapted upon relative movement of the pistons to vary in size, said cylinder having circumferentially spaced fuel intake and exhaust ports, an ignition device communicating therewith between the points of intake and exhaust, coupling elements keyed to the drive shaft having circumferentially spaced peripheral notches, a radially slidable latch on each rotor adapted upon inward radial movement to engage with one of the notches of the coupling elements to couple its rotor with the shaft, a lever pivoted on each rotor having operative connection with the latch for moving the same radially upon swinging movement of the lever, means for normally swinging the lever to move the latch radially outward to a non-coupling relation, a roller on the lever and a cam element formed on the stator having cam faces with which the roller engages for controlling the movement of the latch actuating levers whereby intermittent coupling of the rotors and drive shaft is effected, and means for limiting the movement of the rotors to rotation in one direction whereby the chambers defined between the pistons successfully receive, compress, ignite, and exhaust the fuel charge during the rotation of the rotors within the cylinder.

3. In a rotary motor, a stator having a toroidal cylinder, a drive shaft extending axially through the stator, a pair of rotors each having a pair of diametrically disposed arcuate pistons arranged within the cylinder for subdividing the same into a plurality of compartments or chambers adapted upon relative movement of the pistons to vary in size, said cylinder having circumferentially spaced fuel intake and exhaust ports, an ignition device communicating therewith between the points of intake and exhaust, coupling elements keyed to the drive shaft having circumferentially spaced peripheral notches, a radially slidable latch on each rotor adapted upon inward radial movement to engage with one of the notches of the coupling elements to couple its rotor with the shaft, a lever pivoted on each rotor having operative connection with the latch for moving the same radially upon swinging movement of the lever, means for normally swinging the lever to move the latch radially outward to a non-coupling relation, a roller on the lever and a cam element formed on the stator having cam faces with which the roller engages for controlling the movement of the latch actuating levers whereby intermittent coupling of the rotors and drive shaft is effected, said rotors having engageable abutment elements adapted to coact for moving the same in unison at specified intervals.

4. In a rotary motor, a stator having a toroidal cylinder, a drive shaft extending axially through the stator, a pair of rotors each having a pair of diametrically disposed arcuate pistons arranged within the clyinder for subdividing the same into a plurality of compartments or chambers adapted upon relative movement of the pistons to vary in size, said cylinder having circumferentially spaced fuel intake and exhaust ports, an ignition device communicating therewith between the points of intake and exhaust, coupling elements keyed to the drive shaft having circumferentially spaced peripheral notches, a radially slidable latch on each rotor adapted upon inward radial movement to engage with one of the notches of the coupling elements to couple its rotor with the shaft, a lever pivoted on each rotor having operative connection with the latch for moving the same radially upon swinging movement of the lever, means for normally swinging the lever to move the latch radially outward to a non-coupling relation, a roller on the lever and a cam element formed on the stator having cam faces with which the roller engages for controlling the movement of the latch actuating levers whereby intermittent coupling of the rotors and drive shaft is effected, said rotors having engageable abutment elements adapted to coact for moving the same in unison at specified intervals, said abutments consisting of arcuate shaped bosses on the inner confronting faces of the rotors adapted to overlap and engage in certain relative positions of the rotors.

TRAUGOTT TSCHUDI.